United States Patent [19]

Forderhase et al.

[11] Patent Number: 5,252,264
[45] Date of Patent: Oct. 12, 1993

[54] APPARATUS AND METHOD FOR PRODUCING PARTS WITH MULTI-DIRECTIONAL POWDER DELIVERY

[75] Inventors: Paul F. Forderhase, Austin; Carl R. Deckard, Round Rock, both of Tex.; Jack M. Klein, Downey, Calif.

[73] Assignee: DTM Corporation, Austin, Tex.

[21] Appl. No.: 789,358

[22] Filed: Nov. 8, 1991

[51] Int. Cl.$^5$ ............................................. B23K 26/00
[52] U.S. Cl. ...................................... 264/22; 264/113; 156/62.2; 156/272.8; 425/174.4; 425/218; 425/257; 425/447
[58] Field of Search ...................... 425/174, 174.4, 218, 425/256, 257, 258, 260, 337, 356, 447, 448, 449; 264/22, 58, 112, 113, 125; 156/62.2, 643, 345, 272.8

[56] References Cited

U.S. PATENT DOCUMENTS

| | | | |
|---|---|---|---|
| 4,472,350 | 9/1984 | Urano | 264/113 |
| 4,863,538 | 9/1989 | Deckard | 156/62.2 |
| 4,938,816 | 7/1990 | Beaman et al. | 156/62.2 |
| 4,944,817 | 7/1990 | Bourell et al. | 156/62.2 |
| 5,017,753 | 5/1991 | Deckard | 219/121.63 |

FOREIGN PATENT DOCUMENTS 8802677  4/1988  PCT Int'l Appl. .

OTHER PUBLICATIONS

Sachs, et al. "Three Dimensional Printing of Ceramic Shells and Cores for Metal Casting", *Proc. of the 39th Annual Technical Meeeting: Investment Casting Institute* (1991), pp. 12:1–12:14.

Forderhase, "Design of a Selective Laser Sintering Maching Intended for Academic Research," Master's Thesis (University of Texas, May 1989).

*Primary Examiner*—Jill L. Heitbrink
*Attorney, Agent, or Firm*—Vinson & Elkins

[57] ABSTRACT

An apparatus and method for producing parts by fusing selected portions of a layer of powder at a target area, including the systems for delivering the powder to the target area, is disclosed. Multiple powder pistons are included in the apparatus, each of which lift a volume of powder above a surface in an alternating manner relative to one another. Powder delivery begins by the lifting of a volume of powder at a first location on one side of the target area. A counter-rotating roller moves across the lifted powder, distributes it over the target area, and rests beyond a second powder lifting location on the other side of the target area. Portions of the powder layer are then fused at the target area according to a cross-section of the part to be produced, and is followed by lowering a part cylinder at the target area in order to accept the next layer of powder. A second volume of powder is lifted at the second location, and the counter-rotating roller moves across the second location and the target area to deliver the next layer of powder to the target area. The multiple powder piston system reduces the excess powder in the chamber, speeds the delivery of powder, and facilitates the installation of powder during the process.

26 Claims, 7 Drawing Sheets

APPARATUS AND METHOD FOR PRODUCING PARTS WITH MULTI-DIRECTIONAL POWDER DELIVERY

This invention is in the field of the production of prototype parts in layerwise fashion, and is more particularly directed to the delivery of powder materials in part producing systems.

BACKGROUND OF THE INVENTION

Recent advances have been made in the field of producing prototype parts, or finished parts in small quantities, directly from computer-aided-design (CAD) data bases. An important one of these advances produces parts from a powder in layerwise fashion by scanning selected portions of a layer of powder with an energy beam, such as a laser. The energy from the beam fuses the powder at the scanned locations into a mass within the layer which adheres to portions of previously fused layers. The fused portions of each powder layer are defined according to a cross-section of the part, so that a series of layers processed in this manner results in a finished part. As a computer can control the scanning of the energy beam, this method can directly transfer a design from a CAD data base into an actual part.

This method, and apparatus for performing the same, are described in further detail in U.S. Pat. No. 4,863,538, issued Sep. 9, 1989, U.S. Pat. No. 5,017,753 issued May 21, 1991, U.S. Pat. No. 4,938,816 issued Jul. 3, 1990, and U.S. Pat. No. 4,944,817 issued Jul. 31, 1990, all assigned to Board of Regents, The University of Texas System and incorporated herein by this reference. Parts are now being commercially produced according to this method, namely the "SELECTIVE LASER SINTERING" method, by the SLS Model 125 DeskTop Manufacturing system manufactured by DTM Corporation of Austin, Tex.. As described in the above-noted patents, and also in U.S. Pat. No. 5,156,697 issued Oct. 20, 1992, U.S. Pat. No. 5,147,587 issued Sep. 15, 1992, and U.S. Pat. No. 5,182,170 issued Jan. 26, 1993, all also assigned to Board of Regents, The University of Texas System and incorporated herein by this reference, various materials and combinations of materials can be processed according to this method, such materials including plastics, waxes, metals, ceramics, and the like. In addition, as described in these patents and applications, the parts produced according to the "SELECTIVE LASER SINTERING" method can have shapes and features which are sufficiently complex as to not be capable of fabrication by conventional subtractive processes such as machining.

Other additive methods also fuse selected portions of a layer of powder in the layerwise formation of a three-dimensional part. An example of such a method is described in Sachs, et al. "Three Dimensional Printing of Ceramic Shells and Cores for Metal Casting", *Proc. of the 39th Annual Technical Meeting: Investment Casting Institute* (1991), pp. 12:1–12:14. In this method, a layer of powder, such as a ceramic powder, is dispensed and a binder material is applied to selected portions of the powder, for example by way of an ink-jet printhead. In this method, the locations of the powder layer that receive the binder are defined according to a cross-section of the part to be produced, communicated to the apparatus by a CAD data base.

In these methods, as well as in any additive manufacturing method using layers of powders, the proper delivery of powder is a critical factor. The proper volume of powder must be dispensed in each layer so that the fused portion both adheres to previously fused layer portions, and also provides a fused mass of the proper dimensions to which succeeding fused layers can adhere. In addition, particularly where mixtures of multiple materials are used, good homogeneity and physical uniformity of the powder (i.e., powder particles of uniform size, with no caking or clumping) is necessary for proper part fabrication. Where the part to be produced is a finished part, rather than a form factor model of the part, the powder must also have sufficient density to provide the necessary structural strength.

A roller for properly delivering a layer of powder over a laser target area in the "SELECTIVE LASER SINTERING" process is described in the above-referenced U.S. Pat. No. 5,017,753 issued May 21, 1991, and incorporated herein by reference. As described therein, a counter-rotating roller is used to smoothly spread a volume of powder of the proper thickness over the target area.

The SLS Model 125 DeskTop Manufacturing system manufactured by DTM Corporation incorporates the counter-rotating roller in combination with a dual piston system. In the SLS Model 125 system, one piston is used for lowering the fused and unfused powder in the target area during the fabrication process, so that the top surface of the target area remains at the same distance from the laser. A second piston is located alongside the part piston for providing unfused powder to the process. In operation, the powder piston is first raised a specified amount (e.g., on the order of 0.010 inches) and the part piston is lowered a specified amount (e.g., on the order of 0.005 inches). The counter-rotating roller is moved across the raised surface of the powder piston, pushing the powder to leave a layer over the lowered surface of the part piston. In this way, the SLS Model 125 system provides a measured volume of powder for each layer of the part to be produced.

Figure 1:
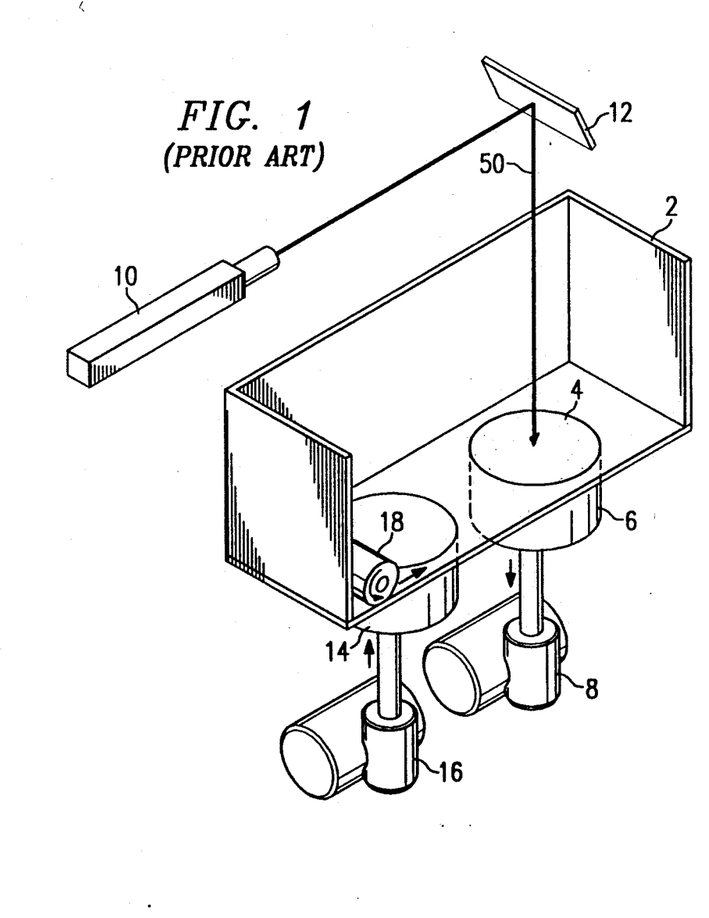
FIG. 1 is a perspective exploded view of an apparatus for producing parts according to the prior art.

Referring to FIG. 1, an example of such a prior apparatus for producing parts in layerwise fashion will now be described. The apparatus shown in FIG. 1 is a schematic representation of the SLS Model 125 DeskTop Manufacturing system. The apparatus of FIG. 1 includes a chamber 2 (front doors and the top of chamber 2 are not shown in FIG. 1, for purposes of clarity), within which the selective sintering process takes place. Target surface 4, for purposes of the description herein, refers to the top surface of heat-fusible powder (including portions previously fused, if present) disposed on part piston 6. The vertical motion of part piston 6 is controlled by motor 8. Laser 10 provides a beam which is reflected by galvanometer-controlled mirrors 12 (only one of which is shown for clarity), in the manner described in the above-incorporated U.S. Patents. Powder piston 14 is also provided in this apparatus, controlled by motor 16. As described in the above-referenced U.S. Pat. No. 5,017,753, counter-rotating roller 18 is provided to transfer the powder to the target surface 4 in a uniform and level fashion. The surface of roller 18 is preferably knurled, or otherwise textured, as described therein.

In operation, the apparatus of FIG. 1 supplies powder to chamber 2 via powder cylinder 14; powder is placed into chamber 2 by the upward partial motion of powder cylinder 14 provided by motor 16. Roller 18 (preferably provided with a scraper to prevent buildup, said scraper not shown in FIG. 1 for clarity) spreads the powder within the chamber by its translation from the location of powder cylinder 14 toward and across target surface 4 at the surface of the powder on top of part piston 6, in the manner described in said U.S. Pat. No. 5,017,753. At the time that roller 18 is providing powder from powder piston 14, target surface 4 (whether a prior layer is disposed thereat or not) is preferably below the floor of chamber 2 by a small amount, for example 5 mils, to define the thickness of the powder layer to be processed. It is preferable, for smooth and thorough distribution of the powder, that the amount of powder provided by powder cylinder 14 be greater than that which can be accepted by part cylinder 6, so that some excess powder will result from the motion of roller 18 across target surface 4; this may be accomplished by the upward motion of powder piston 14 by a greater amount than the distance below the floor of chamber 2 to which target surface 4 is lowered (e.g., 10 mils versus 5 mils). It is also preferable to slave the counter-rotation of roller 18 to the translation of roller 18 within chamber 2, so that the ratio of rotational speed to translation speed is constant.

Further in operation, after the transfer of powder to target surface 4 and the return of roller 18 to its original position near powder piston 14, laser 10 selectively sinters portions of the powder at target surface 4 corresponding to the cross-section of the layer of the part to be produced, in the manner described in the above-referenced U.S. Patents. The sintering is preferably performed in alternating directions, as described in U.S. Pat. No. 5,155,324 issued Oct. 13, 1992, and incorporated herein by this reference. After completion of the selective sintering for the particular layer of powder, part piston 6 moves downward by an amount corresponding to the thickness of the next layer, awaiting the deposition of the next layer of powder thereupon from roller 18.

One or more radiant heaters (not shown) are suspended from the roof of chamber 2 (in a manner not shown); the preferred shapes of such radiant heater include a ring, a partial cone, or flat panels. U.S. Pat. No. 5,155,321 issued Oct. 13, 1992 assigned to DTM Corporation and incorporated herein by this reference, describes the preferred implementation of such radiant heaters. As disclosed therein, radiant heat applied to the target surface assists in maintaining temperature uniformity so that a high precision part may be formed. Furthermore, gas flow distribution may also be provided within chamber 2, for example by way of a baffle and vents (not shown), also for maintaining thermal uniformity in the part being formed. Such gas flow distribution is described in U.S. Pat. No. 5,155,321 assigned to DTM Corporation and incorporated herein by this reference.

In the prior arrangement of FIG. 1, a single powder piston 14 is provided, and located along one side of target surface 4 at the top surface of part piston 6. As such, the powder is delivered in a single direction, with any excess powder remaining in chamber 2 on the side of part piston 6 opposite powder piston 14. Periodic cleaning and recovery of such excess powder is therefore required. Furthermore, the process of producing parts is slowed by the necessity of roller 18 to return to its prior position after each layer of powder is applied over target surface 4. It is contemplated that the provision of powder over target surface 4 will become an even greater portion of the overall fabrication time for a part as the laser power and optics, and also thermal control, continues to improve.

It is therefore an object of this invention to provide a powder delivery system which provides improved powder utilization and reduced powder loss.

It is a further object of this invention to provide such a system which facilitates the installation of unfused powder prior to production of the part, and also the removal of powder which is not fused during such production.

It is a further object of this invention to provide such a system in which multiple types of powders may be delivered in alternating layers.

It is a further object of this invention to provide such a system having improved efficiency of production due to improved efficiency powder delivery.

Other objects and advantages will become apparent to those of ordinary skill in the art having reference to the following specification together with the drawings.

SUMMARY OF THE INVENTION

The invention may be incorporated into an apparatus and method for producing parts from a powder-based additive process. Multiple powder pistons are provided on opposing sides of the target area from one another. Powder is delivered by the motion of a counter-rotating roller across the surface of one of the powder pistons, pushing the powder into the volume of the part piston, and allowing excess powder to fall into the opposing powder piston. The next layer of powder is delivered from the second powder piston, by way of the counter-rotating roller traveling in the opposite direction.

DETAILED DESCRIPTION OF THE PREFERRED EMBODIMENT

Figure 2:
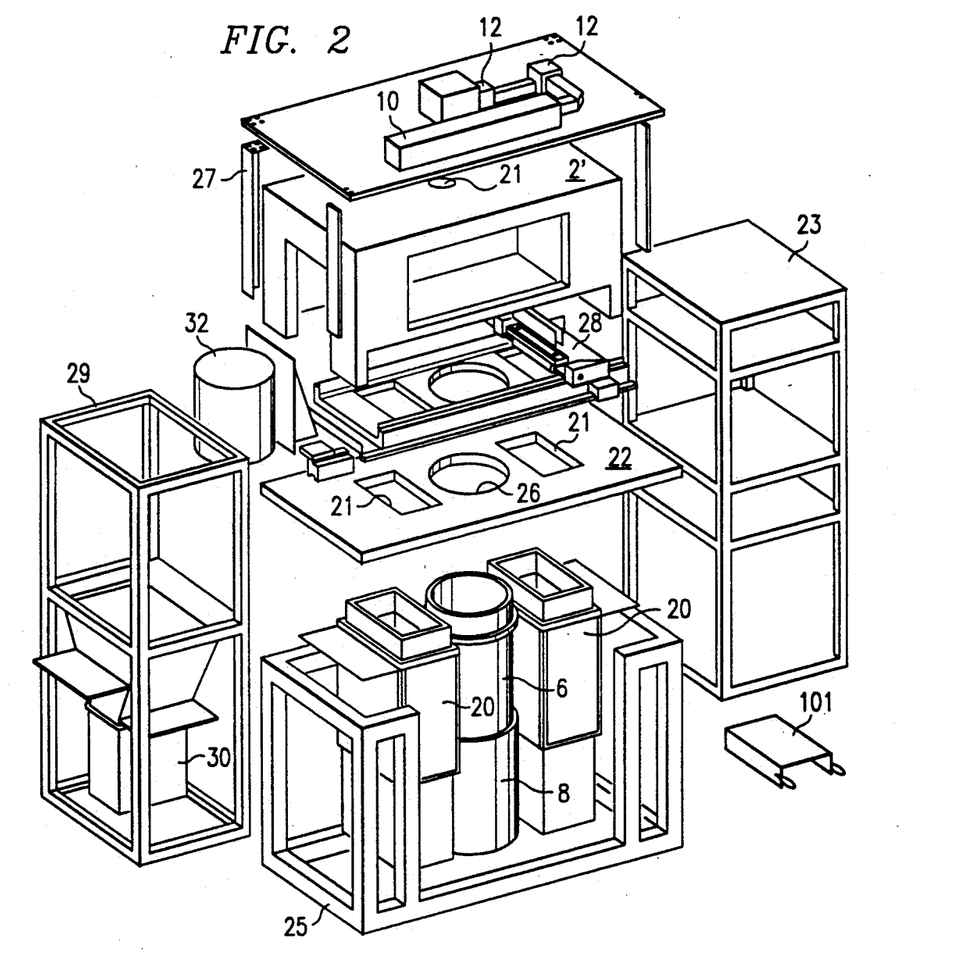
FIG. 2 is a perspective exploded view of an apparatus for producing parts according to the preferred embodiment of the invention, illustrating the components of the powder delivering engine in simplified form.

Referring now to FIG. 2, an apparatus for producing parts including a powder delivery engine according to the present invention will now be described, relative to a simplified schematic version thereof. For ease of description and viewing, the system of FIG. 2 is illustrated in exploded fashion, without cover plates and the like; in addition, similar elements as shown in FIG. 1 are referred to in FIG. 2 with the same reference numerals.

Chamber 2 is, as in the prior version, an oven or other enclosure which provides thermal integrity for the additive process by which a part is produced in layerwise fashion from a powder base, as in the case of the "SELECTIVE LASER SINTERING" process noted hereinabove. Radiant heaters, as described in the above-noted copending application Ser. No. 611,309, filed Nov. 9, 1990, assigned to DTM Corporation and incorporated herein by this reference, and gas flow distribution elements, as described in the above-noted copending application Ser. No. 611,030, also filed Nov. 9, 1990, assigned to DTM Corporation and incorporated herein by this reference, are each preferably also included within chamber 2 in this system. International application PCT/U.S. 91/08351, entitled "Controlled Gas Flow for Selective Laser Sintering", filed contemporaneously herewith and incorporated herein by this reference, and which is a continuation-in-part of the above-noted copending application Ser. No. 611,030, describes a particularly advantageous gas distribution system including a plenum with removable side walls, and a diffuser, for selectively distributing gas flow to target surface 4 in a highly uniform manner.

Structural support 25 houses powder piston assemblies 20 and part cylinder 6, and supports leveling plate 22. Roller assembly 28 is mounted to and disposed over leveling plate 22; the part producing process is performed near the top surface of roller assembly 28 at an opening therethrough directly above the top surface of part and center opening 26 in leveling plate 22. Structural support 23 is adjacent leveling plate 22 and structural support 25, for housing the computer and control electronics for the system. Vertical supports 27 are at corners of chamber 2 and support the laser assembly.

On the opposite side from support 23, structural support 29 houses powder recovery system 30. Hat assembly 32 is also under chamber 2 by which the completed part and the unfused powder entrained thereby can be removed without opening chamber 2. The system can thus be operated as a self-contained unit in which powder is delivered to the chamber in cartridges, where used powder is removed in cartridges, and where parts are separated in situ after having been cleaned of entraining powder, all without requiring opening of the system and exposure to its environment. The integrated powder handling system provided by powder recovery system 30 and hat assembly 32, in combination with powder cartridges 40 (described in further detail hereinbelow) and powder piston assemblies 20, is contemplated to be particularly useful in the production of parts from hostile powder material. As many parts are produced from non-hostile material, however, powder recovery system 30 and hat assembly 2 are optional and not essential in the system. In the absence of powder recovery system 30 and hat assembly 2, the completed part and entrained unfused powder are removed from part cylinder 6 through a door in the front of structure 25.

According to the preferred embodiment of the invention, leveling plate 22 is formed as a single machined structure, for example as a single casting of a strong material such as cast iron or steel. The thickness of leveling plate 22 is also preferably sufficient to provide solid support without bending or otherwise distorting, an example of such thickness being on the order of two inches. By providing a single casting as leveling plate 22, it has been found that the precision and repeatability of the system is improved. This is because the mechanical tolerances of the mounting of various elements (e.g., roller guide rails 36, laser 10, part cylinder 6, etc.) can all be made in reference to leveling plate 22, rather than in reference to other elements mounted to leveling plate 22. In particular, roller guide rails 36 overlying leveling plate 22 can be mounted thereto to a high degree of precision, thus ensuring a level powder surface which is substantially perpendicular to the centerline of part cylinder 6. Accordingly, the effects of tolerance stacking are not evident in this embodiment of the invention, thus improving the overall accuracy and precision of the system and the parts produced thereby.

Laser 10 is located above chamber 2, and generates a focused energy beam which is directed by mirror assemblies 12, according to the cross-section of the part to be formed as specified in a CAD data base; electronics cabinet 23 will contain the necessary computer system and interface circuitry for receiving a CAD data base and controlling the system of FIG. 2, including mirror assemblies 12, accordingly. The laser beam, in this example, is directed through hole 21 in the ceiling of chamber 2, and is directed to the target area at the top of part cylinder 6. Details concerning the scanning process, including the scanning of alternate layers of the powder at the target area in alternating directions, are described in the above-noted copending application Ser. No. 611,025, filed Nov. 9, 1990, and incorporated herein by this reference.

The powder delivery apparatus ("engine") according to this embodiment of the invention includes multiple powder piston assemblies 20; in this example, two powder piston assemblies 20 are provided on opposite sides of part cylinder 6. Powder piston assemblies 20 provide fusible powder to a target area at the top surface of part cylinder 6, through openings 21 in leveling plate 22, and through cooperating openings through liner plate 38. Examples of the various powders useful in the present invention are described in the above-noted patents and applications, and include plastics, waxes, metals, ceramics, and combinations thereof. Roller assembly 28 includes a counter-rotating roller with a knurled or roughened surface, which travels back and forth across liner plate 38 above leveling surface 22 in this embodiment of the invention, providing a uniform layer of powder thereat in the manner described in further detail hereinbelow.

Figure 3A:
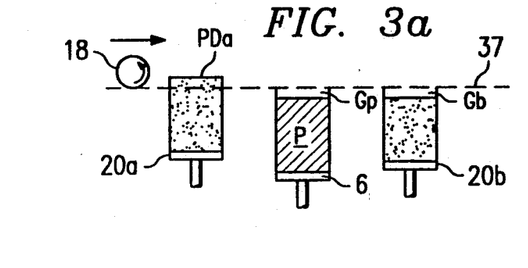
FIGS. 3a through 3c are schematic illustrations showing the operation of the preferred embodiment of the invention.
Figure 3B:
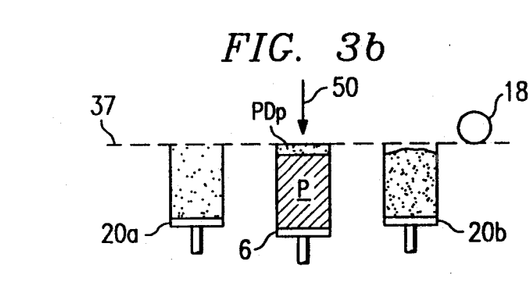
Figure 3C:
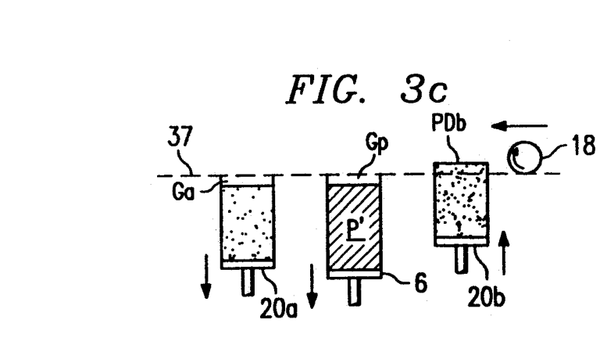

Referring now to FIGS. 3a through 3c, an example of the operation of powder piston assemblies 20 and part cylinder 6 according to the preferred embodiment of the invention will now be described. Prior to the position illustrated in FIG. 3a, a layer of powder has been selectively fused over part cylinder 6 by laser 10, forming part P thereover.

FIG. 3a illustrates the position of the system as it prepares to deliver the next layer of powder. After such processing of the powder by laser 10, powder piston 20a moves upward by a specified amount, so that a volume of powder $PD_a$ extends above levelling plane 37 which is parallel to and above the top surface of leveling plate 22; levelling plane 37 corresponds to the top of the powder that will be left by the travel of roller 18 thereacross. In addition, part cylinder 6 drops below leveling plane 37 by another specified distance, preferably less than the distance by which powder piston 20a moved upward, leaving a gap $G_p$ between the top surface of part P (including fused and unfused entraining powder) and leveling plane 37. The gap $G_p$ defines the thickness of the layer to be selectively fused by laser 10 in the next layerwise process. Powder piston 20b also preferably moves downwardly to catch excess powder as will be described hereinbelow. An example of the thickness of powder volume $PD_a$ is on the order of 0.010 inches, with an example of gaps $G_p$ and $G_b$ on the order of 0.005 inches. An example of the distance between leveling plane 37 and the top surface of leveling plate 22 is on the order of 0.030 inches.

Once the powder volume $PD_a$ is displaced above leveling plane 37, and once the desired gaps $G_p$, $G_b$ are set, roller 18 is moved across leveling surface 22 in a counter-rotating manner. As described in the above-noted U.S. Pat. No. 5,017,753, the counter-rotation of roller 18 serves to eject powder in front of roller 18 as it travels across leveling plane 37 over leveling plate 22, assisting in the distribution of the powder thereover. It is also preferable that the rotation of roller 18 be slaved to the translation thereof across leveling plate 22, so that a constant angular velocity of roller 18 can be maintained. Furthermore, as described in the above-noted patent, it is preferred that the surface of roller 18 be knurled or otherwise roughened, for best powder dispensing.

FIG. 3b schematically illustrates the system after roller 18 has traversed leveling plate 22. Leveling plane 37 defines how much powder remains above the various surfaces of the pistons 20, 6 (as well as over the remainder of leveling plate 22, such remaining powder not shown for purposes of clarity). A volume of powder $PD_p$ has filled in gap $G_p$ over part cylinder 6 with its top surface coplanar with leveling plane 37. As noted above, the top surface of powder volume $PD_p$ may be on the order of 0.030 inches above the top surface of leveling plate 22.

It is highly preferred that the volume of powder $PD_a$ presented by powder piston 20a in this step be greater than the volume $PD_p$ required for the laser fusing process. This ensures that a uniform thickness of fusible powder is placed in the target area over part cylinder 6; roller 18 is capable of removing excess powder, but cannot, of course, provide a uniform layer thereover if an insufficient volume of powder $PD_a$ is provided. The presence and lowering of powder piston 20b recaptures some of this excess powder, and allows its re-use in the next operation. As shown in FIG. 3b, gap $G_b$ is filled in to some extent with the excess powder from the operation of FIG. 3a.

At this point in the process illustrated in FIG. 3b, selected portions of powder volume $PD_p$ may be irradiated by beam 50 from laser 10, fusing the powder in the irradiated areas to itself, and to fused portions of the powder in part cylinder 6 therebelow, as described in the above-noted patents.

Referring now to FIG. 3c, the delivery of powder after the laser processing step of FIG. 3b will now be described. Powder piston 20b is displaced upwardly by a specified distance, similarly as powder piston 20a in FIG. 3a, providing a volume of powder $PD_b$ extending above leveling plane 37. The top surface of powder $PD_b$ may be made uniform by way of a redistributor, such as a moving screen or the like, as will be described in further detail hereinbelow; alternatively, large upward displacement of powder piston 20b can ensure that sufficient powder is provided regardless of non-uniformity in the powder top surface (or of the amount of excess powder provided thereover by the operation of FIG. 3a).

Alternatively to mechanical means such as a redistributor, proper control of the gap $G_p$ by which part cylinder 6 is lowered, and of the powder volumes $PD_a$, $PD_b$ provided by powder pistons 20a, 20b, respectively, can provide efficient powder distribution. For example, referring to FIG. 3a, the powder volume $PD_a$ can be selected so that, upon traverse of roller 18 thereover, it is exhausted at the far edge of powder piston 20b. This selection and control can ensure a smooth surface over the one of powder pistons 20a, 20b which is lowered to catch the excess powder.

Also at this time, part cylinder 6 (with part P' located thereabove after the processing of FIG. 3b) and powder piston 20a are each lowered, providing gaps $G_p$, $G_a$, respectively, as before. Roller 18 is then moved across leveling plate 22 in a counter-rotating manner (in the opposite direction both linearly and rotationally from that of the operation of FIG. 3a), so that a smooth layer of powder is provided over part cylinder 6 for selective fusing as in the prior step.

Another advantage of the present invention should also now be apparent from the foregoing description, such advantage directed to the efficiency of operation of the powder distribution process. With second powder piston 20b located across part cylinder 6 from first powder piston 20a, roller 18 need not be returned to its position of FIG. 3a prior to delivering the next powder layer, as it need only travel back from its position in FIG. 3b. The motion of roller 18 is thus cut in half by the present invention, saving a movement of roller 18 and the manufacturing time required therefor.

Figure 4:
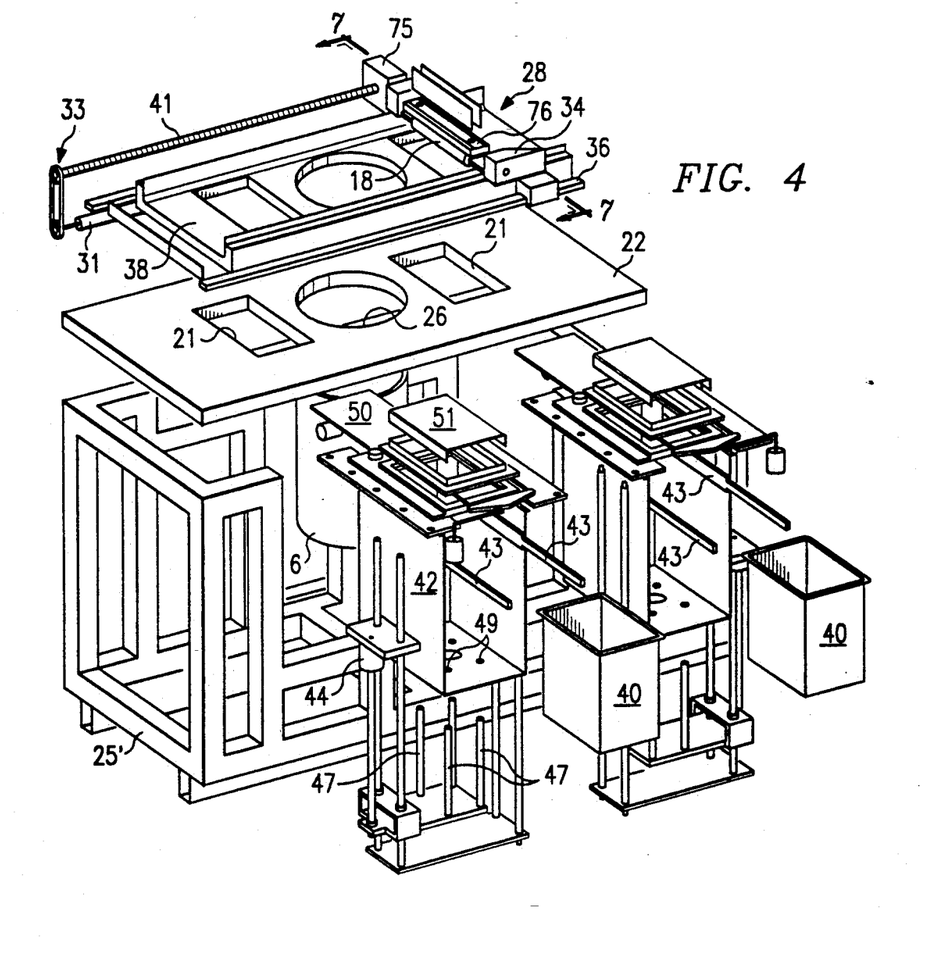
FIG. 4 is a perspective exploded view of the dual piston powder delivery system according to the preferred embodiment of the invention.

Referring now to FIG. 4, the preferred embodiment of a dual piston powder delivery system according to the present invention will now be described in detail. FIG. 4 is an exploded perspective view of a portion of the system of FIG. 2, including the preferred implementation of powder piston assemblies 20 therein. As illustrated in FIG. 4, leveling plate 22 includes openings 21, 26, through which the fusible powder is delivered and selectively fused in the manner described above. Roller assembly 28 is disposed over leveling plate 22, and includes roller 18 supported upon rails 36. Powder is prevented from contaminating roller guide rails 36 by lip seals 34 on either side of roller assembly 28; only the upper half of lip seals 34 are shown in FIG. 4 for purposes of clarity. Liner plate 38 includes openings therethrough which cooperate with openings 21, 26 in leveling plate 22. Roller assembly 28 is moved across and above levelling plate 22 by the action of motor 40, which turns leadscrew 41 via gear and chain assembly 43. Drive assembly 75 is connected to roller 18 and rotates it counter to the direction of its translation along leadscrew 41, preferably in a slaved manner as described below. The fusible powder is thus delivered over part cylinder 6 in the manner described above relative to FIGS. 3a through 3c.

Referring now to FIGS. 7 through 11, the preferred embodiment of roller assembly 28 will now be described in detail. In this embodiment, roller assembly 28 is particularly adapted to travel across leveling plate 22 in two directions, with roller 18 rotating counter to the direction of travel in each direction, so that the method described above relative to FIGS. 3a through 3c is performed. In addition, roller assembly 28 includes roller carriage 76 which, together with roller 18 is preferably easily removable from roller assembly for cleaning and other maintenance.

Figure 7:
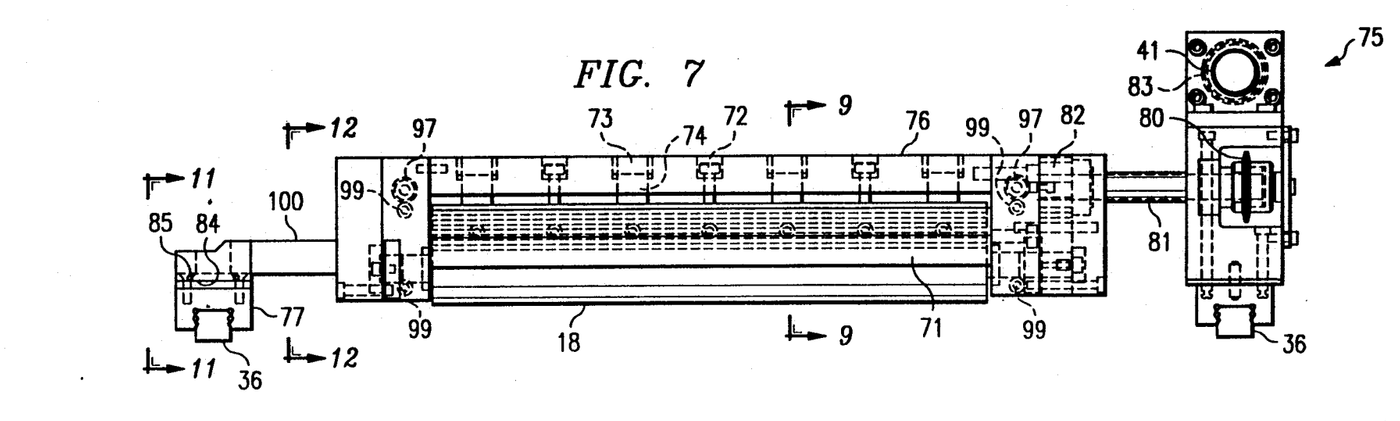
FIGS. 7 through 11 are various views of the roller assembly according to the preferred embodiment of the invention.

As noted hereinabove relative to FIG. 4, roller assembly 28 is powered by motor 40 via leadscrew 41. Referring to FIG. 7, leadscrew 41 is received within drive assembly 75, which is threaded thereto so that rotation of leadscrew 41 results in linear translation of roller assembly 28 therealong, in the conventional manner. Also included within drive assembly 75 is chain sprocket 80 which is turned during linear motion of drive assembly 75 by a stationary roller chain (not shown) attached to a stationary structure at each end of the path of drive assembly 75. Linear motion of drive assembly 75 causes chain sprocket 80 to rotate as the stationary roller chain passes over it. Chain sprocket 80, via shaft 81 and gear train 82, rotates roller 18 counter to the direction of travel along leadscrew 41. In this manner, the counter-rotation of roller 18 is slaved to the linear travel of roller assembly 28, so that the angular velocity ($\Omega$, sec$^{-1}$) of roller 18 is related to the linear velocity (v, m/sec) of drive mechanism 75 and to the pitch diameter (D, m/sec) of chain sprocket 80, by the following relationship:

$$\Omega = 2v/D$$

Figure 9:
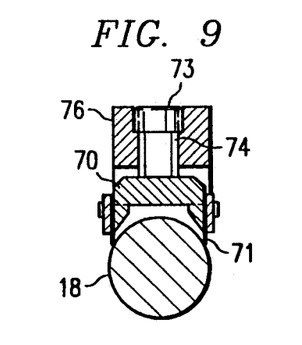

Referring now to FIGS. 7 and 9, roller 18 is illustrated in cross-section in combination with a scraper mounted thereto. Scraper blades 71 are suspended from blade support 70 to contact both sides of roller 18. Blades 71 serve to dislodge powder from roller 18 as it turns, ensuring that the knurled surface of roller 18 remains clean and capable of providing a smooth top surface of delivered powder. Blades 71 are preferably relatively thin (e.g., on the order of 0.015 inches thick) blades of stiff material such as hardened steel. Roller 18 itself is preferably formed of wear-resistant material such as M4 tool steel. Blades 71 are held against roller 18 by way of threaded plugs 73 acting upon push pins 74, so that the pressure of blades 71 against roller 18 can be calibrated by the number of turns of plugs 73. Push pins 74 may be solid material such as steel; alternatively, push pins 74 may be fabricated of a resilient material such that the pressure of blades 71 is determined by its compression from plugs 73. As shown in FIG. 7, push pins 74 and plugs 73 are preferably spaced along the length of carriage 76; standoffs 72 are preferably interleaved with plugs 73 to limit the extent to which blades 71 may be pushed against roller 18, particularly when worn.

Other alternative roller and scraper combinations may also be used in the present invention. For example, roller 18 may be coated with wear-resistant material, rather than formed of a solid piece of such material. In the alternative to blades 71, other mechanisms for removing caked powder from roller 18 may be used, an example of which is a set of brushes.

As illustrated in FIG. 7, drive assembly 75 and rider assembly 77 each ride along rails 36. Rider assembly 77 is attached to carriage 76 by way of non-rotating shaft 100. Drive assembly 75 includes dovetail slide 84 which provides a thermal expansion joint within rider assembly 77, so that thermal expansion and contraction of carriage 76 and the remainder of roller assembly 28 does not damage roller rails 36. Set screws 85 both hold dovetail slides 84 in place and pre-load dovetail slides 84 in a controllable manner.

Figure 8:
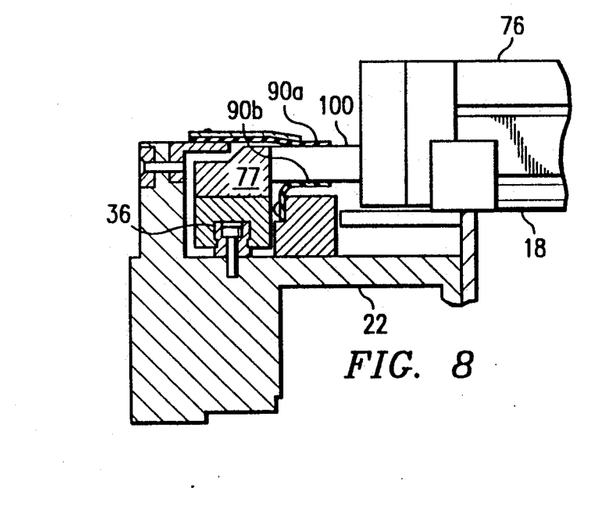
Figure 10:
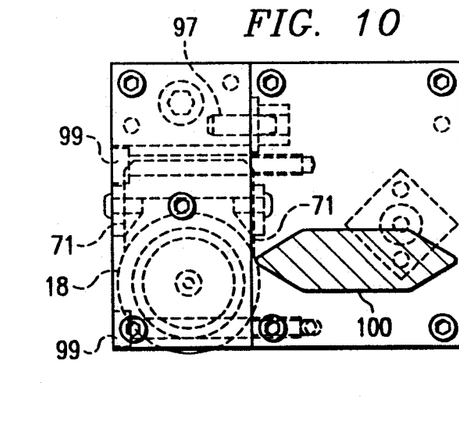
Figure 11:
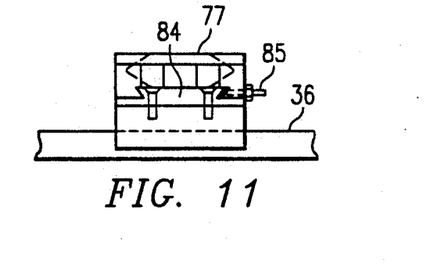

Referring now to FIG. 8, roller assembly 28 is shown in combination with rails 36 mounted directly upon leveling plate 22. It is preferred that powder be sealed from the location of rails 36, as contamination of rails 36 with powder (especially low temperature powders such as wax) would result in rough and jerky travel of roller assembly along leadscrew 41 and over leveling plate 22. In this embodiment of the invention, lip seals 90a, 90b are provided along the length of rails 36, and are in contact with the top and bottom, respectively, of non-rotating shaft 100 between carriage 76 and rider assembly 77. Lip seals 90a, 90b are preferably each formed of a sheet of stiff resilient material, such as a stiff rubber, pressed against one another to provide a seal outside of the vicinity of shaft 100. As shown in FIG. 10, shaft 100 preferably has a shape with pointed ends to facilitate the opening of lip seals 90a, 90b as carriage 76 travels along leadscrew 41 (and also the closing of lip seals 90a, 90b once carriage 76 has passed). Alternatives to lip seals 90a, 90b in the configuration shown include covers, bellows, and the like which serve to seal rails 36 and their interface with rider assembly 77 from the powder delivered by roller assembly 28.

Figure 12:
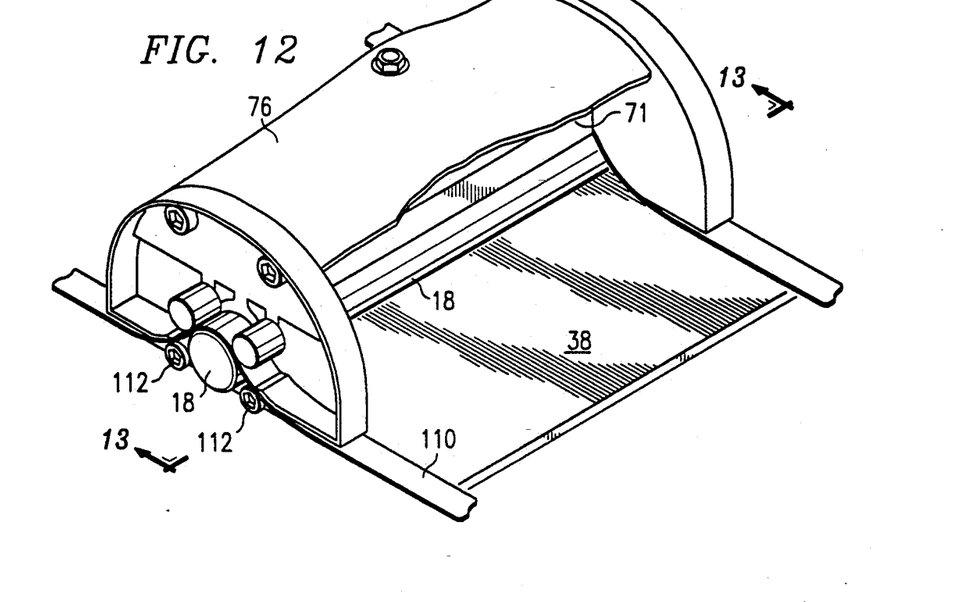
FIGS. 12 and 13 are perspective and cross-sectional views of an alternative embodiment of the roller assembly.
Figure 13:
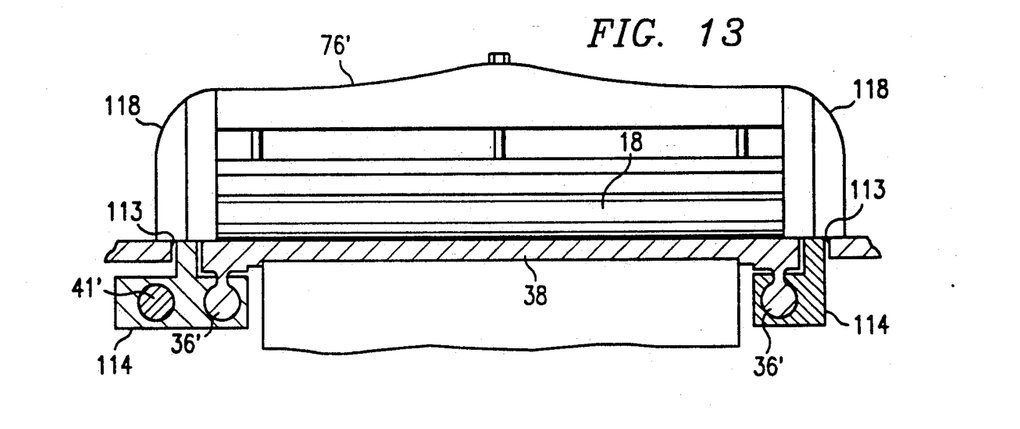

Another alternative embodiment of roller assembly 38 will now be described relative to FIGS. 12 and 13. In this embodiment, where guide rails 36' are located well below liner plate 38 (see FIG. 13), metal tape 110 serves not only as a seal between roller 18 and guide rails 36', but also drives the rotation of roller 18. In this embodiment, slots 113 are provided through liner plate 38 on each side of roller 18, and metal tape 110 is provided thereover to seal guide rails 36' from the overlying volume. Metal tape 110 passes through carriage housing 118 on each side of carriage 76', passing over the ends of roller 18, to allow supports 114 to extend from bolts 112 of carriage housing 118 through liner plate 38, under tape 110, and to mate with leadscrew 41' and guide rails 36' under liner plate 38.

In operation, carriage 76' travels along leadscrew 41' as it rotates, as in the above embodiment. As carriage 76' travels linearly, metal tape 110 turns roller 18 in a counter-rotating manner relative to the linear motion, and according to the relationship described hereinabove. The seals provided by metal tape 110 thus allow carriage 76' to travel along a smooth and level surface, facilitating removal of the part and entraining unfused powder from the front of the system.

Referring back to FIGS. 7 and FIG. 10 relative to the preferred embodiment, four bolts 99 are provided by which the carriage 76 with roller 18 and blades 71 is easily removable from roller assembly 38, for maintenance and cleaning; such maintenance, and replacement, of roller 18 is especially necessary where ceramic powders are being used, due to their abrasive nature. Pins 97 are used to provide proper registration for roller 18 relative to guide rails 36 (via rider assembly 77, drive assembly 75, and shafts 100, 81, respectively). In addition, it is also preferred that all surfaces within chamber 2 (including radiant heater panels) be easily removable, and have smooth surfaces, to facilitate their periodic cleaning.

Figure 5:
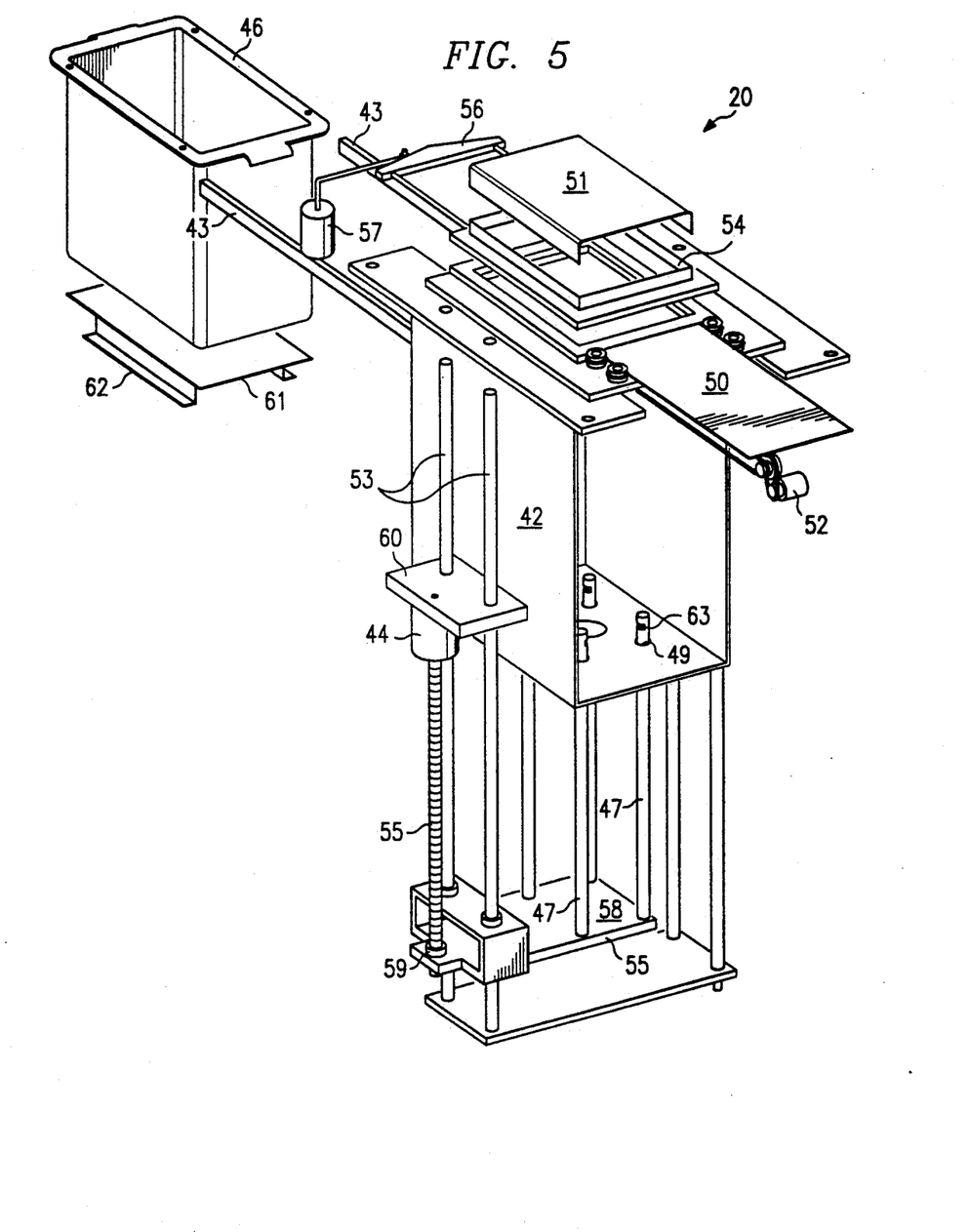
FIG. 5 is a perspective exploded view of one of the pistons in the powder delivery system of FIG. 4.

Referring back to the simplified cases described hereinabove relative to FIGS. 2 and 3a through 3c, dual powder piston assemblies 20 are provided in the powder delivery system of FIG. 4. Reference is also directed to FIG. 5, which shows a single powder piston assembly 20 as used in the system of FIG. 4. Powder cartridges 40, in this embodiment of the invention, are removable through front door openings in the structure 25' to provide easy installation of the desired fusible powder into the system. Each of powder cartridges 40 includes a bottom panel which is movable upwardly into the interior volume thereof, and which can be pushed upwardly into the interior thereof by piston 61 shown in FIG. 5. Each of powder cartridges 40 also have lip 46 around its open top perimeter, shaped to mate with and hang upon drawer slides 43. Powder cartridges 40 can be used for storage of the powder prior to its processing, preferably using a cover which mates with lip 46. Use of cartridges 40 for powder storage and delivery can allow for multiple cartridges 40 to be used in the production of a single part, without requiring the system to be shut down to remove and replace an empty cartridge 40.

Alternatively to cartridges 40 with fixed sides and a movable bottom panel, the powder cartridges may consist of a bag containing the powder, which is placed into a holder (resembling cartridge 40 of FIGS. 4 and 5) with rigid sides and no bottom. In this case, the powder piston would preferably have a flat rigid surface, so that its upward motion would push the bag upward within the holder and displace powder from the top. It is contemplated that this and other alternatives to cartridges 40 will now be apparent to those of ordinary skill in the art having reference to the present specification and drawings.

Housing 42 is located within the system, of sufficient size and shape that cartridge 40 may fit thereinto when installed. Drawer slides 43 are preferably extendible away from housing 42 so that, in installation of the powder, powder cartridges may be pinned or screwed thereto, with cartridge 40 and drawer slides 43 pushed together into housing 42. Tabs 62 are mounted to the underside of piston 61, and mate with slots 63 in piston rods 47 (shown in FIG. 5). Upward and downward motion of piston rods 47 are thus transmitted as compressive and tensile forces, respectively, to the interior of cartridge 40. As a result, the installation of cartridges 40 into the system also serves to engage powder piston assembly 20.

Powder piston assembly 20 also includes motor 44, mounted on clamp plate 60 which, in turn, clamps to guide rods 53. Motor 44 is attached to leadscrew 55 which in turn passes through threaded nut 59 attached to moving plate 58. Piston rods 47 are also attached to moving plate 58, each including slots 63 near their upper ends (which extend through holes 49 in the bottom of housing 42) for receiving and mating with tabs 62 of piston 61.

In operation, motor 44 rotates leadscrew 55 which drives threaded nut 59 therealong in conjunction with moving plate 58 and piston rods 47. Piston rods 47, mated to tabs 62 by slots 63, thus push piston 61 upwardly into powder cartridge 40 to deliver the powder through its associated opening 21, and also pull piston 61 downwardly the desired distance as desired. Both directions of travel are desired in the operation of this system, as described hereinabove relative to FIGS. 3a through 3c.

Control of the distance that piston 61 is moved during the part producing process may be maintained in several ways. For example, the position of piston 61 may be monitored and the distance of upward or downward displacement thereof determined by reference to its starting position. Alternatively, it may be more accurate to monitor the level of the powder at the top of each cartridge 40, for example by way of a capacitive or ultrasonic proximity switch, so that upward and downward displacement of piston 61 can be measured relative to the actual surface of the powder.

In addition, it is also preferable to monitor and control the temperature of the powder in cartridges 40 as it is being fed to chamber 2. In particular, it is especially important to monitor the top surface of the powder, in order to limit thermal transients at the target surface and other problems resulting from improper surface temperature. Such temperature measurements may be made by way of conventional thermocouples suspended into the powder from brackets. For monitoring the near surface of the powder, for example the upper 0.005 to 0.010 inches thereof, it has been found that the brackets should be of a material which matches the thermal conductivity of the powder. For example, where the powder to be processed is a plastic (polycarbonate, ABS, etc.), phenolic brackets can be used to suspend the thermocouples thereinto. As a result, thermal conduction through the brackets will not affect the accuracy of the powder surface temperature measurement.

Knife valve 50 is movable across the top of powder piston assembly 20 by way of belt drive motor 52, to close the opening above cartridge 40 and isolate the process chamber 2 therefrom. This allows for the removal and reinstallation of cartridges 40 without significantly disturbing the environment in which parts are being produced, allowing the processing of powder from the opposite powder piston assembly 20 during the changing of a cartridge 40. It is also contemplated that, while knife valve 50 is a desirable option in the system to facilitate such cartridge changing, its presence is not essential in the production of parts and therefore it may be omitted in some systems.

An alternative to knife valve 50 is illustrated in FIG. 2. Removable knife valve 101 can be inserted into and removed from between powder piston assembly 20 and leveling plate 22 from the front of support 25, during the operation of replacing a cartridge 40. This provides the benefits described hereinabove relative to knife valve 50 in a lower cost and less complex arrangement.

Redistributor 51 is also optionally provided in powder piston assembly 20, located above knife valve 50. Redistributor 51 may include a perforated plate, screen, wires or other similar mechanism which can be moved by motor 57 and linkage 56 through the volume of powder pushed upwardly out of cartridge 40. Redistributor 51 can thus break up cakes or clumps of powder which may have formed, especially in low temperature materials such as wax powders. In addition, redistributor 51 can move the powder to such an extent that its top surface is relatively flat. This allows for a metered volume of powder to be delivered by motion of motor 44 and plunger pins 47 over a known upward displacement, ensuring that the delivered powder is of sufficient volume to fill the desired layer over part cylinder 6. In addition, in the event that excess powder from the opposite powder piston assembly 20 is received by this powder piston assembly 20, redistributor 51 serves to level out this falling powder as well.

Figure 6:
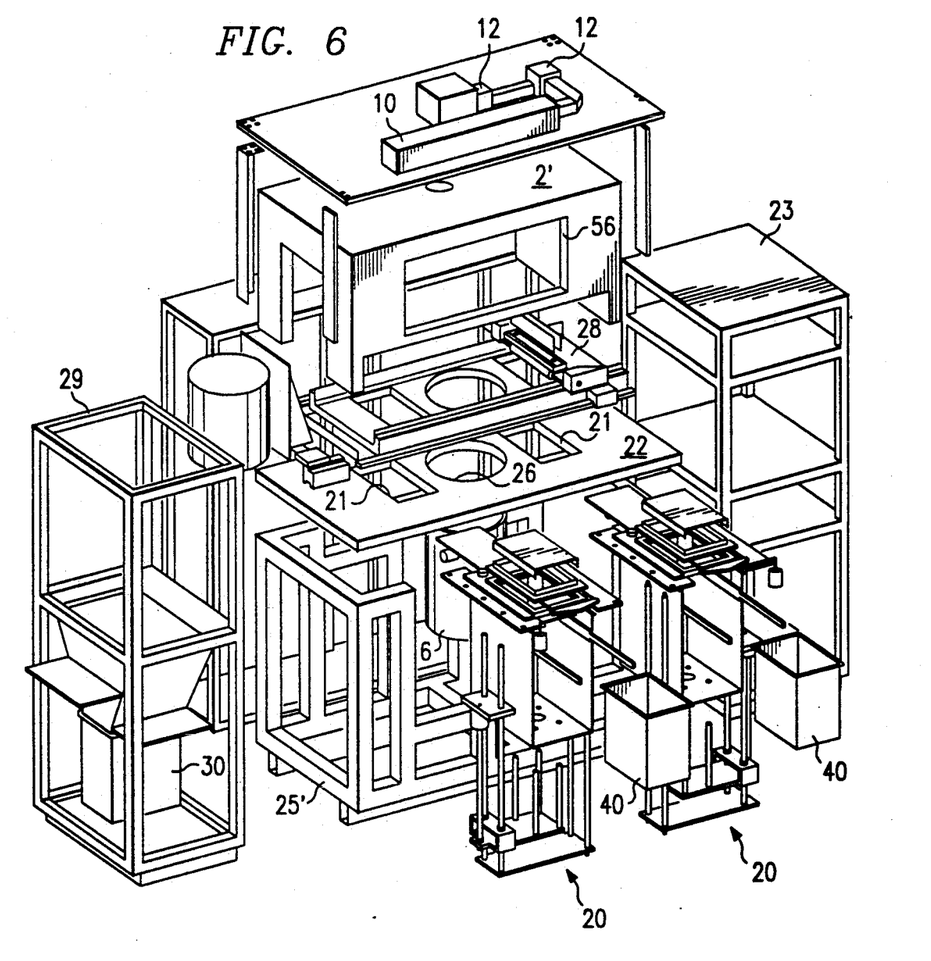
FIG. 6 is a perspective exploded view of the apparatus for producing parts including the powder delivering engine illustrated in FIGS. 4 and 5.

Referring now to FIG. 6, powder piston assemblies 20 are shown, in an exploded perspective view, together with the remainder of the structure of the system according to the preferred embodiment of the invention. Chamber 2' is placed above roller assembly 28, and includes window 56 therethrough for viewing the part producing process. Laser 10 and mirrors 12 are located above chamber 2', and can be directed to the target area above part cylinder 6 through a hole in the top of chamber 2'. Electronic chassis 23 is provided along the side of leveling plate 22, with optional powder recovery system 30 along the other side thereof. Structure 25', located under leveling plate 22, includes openings therethrough which allow for powder cartridges 40 to be easily removed and installed into the system via drawer slides 43. Of course, the system of FIG. 6 will be completed by the installation of panels around the structure to protect the internal mechanisms from external factors, and installation of radiant heaters, gas distribution systems, and the like as described hereinabove.

The present invention thus provides important advantages in the delivery of powder to the target area at which additive part producing processing occurs. The provision of multiple powder pistons together with the roller assembly greatly improves the efficiency of powder delivery by no longer requiring return of the roller to the same starting position after each delivery. In addition, a large amount of excess powder is easily retrieved by the opposite powder piston, and directly returned to the processing target area in the next powder delivery step. This allows for improved powder usage, by reducing waste. The volume of excess powder remaining in the chamber during processing is also reduced in the present invention, thus reducing the potential of process contamination and also reducing the necessity to stop the process in order to remove the excess powder.

The present invention also provides easy access to multiple sources of powder. As a result, the installation of powder into the system can be easily performed, even while maintaining the chamber at temperature. This allows for the formation of large parts (or multiple parts) in a single chamber cycle, even where the amount of powder required for part formation is in excess of the capacity of a single cartridge.

The present invention also enables the use of multiple materials in the additive processes described hereinabove. For example, the easy removal and installation of the powder cartridges enables the use of different materials at different stages of the part producing process, thus allowing a layered part to be produced (e.g., a part having a plastic portion in contact with a ceramic portion). In addition, multiple powder cartridges may be used where each contains a different material. In this case, sequencing of the roller assembly to deliver powder of the varying types at the proper time can provide a multiple material layered part.

As noted hereinabove relative to the preferred embodiment, the present invention is particularly useful in the producing of parts by fusing selected portions of a powder layer with an energy beam, such as a laser, as performed in the "SELECTIVE LASER SINTERING" process available from DTM Corporation. Other powder-based additive processes, such as that described in the Sachs et al. article cited hereinabove, can also benefit from the present invention.

Furthermore, the present invention also allows the machine to be operated as a self-contained unit in which powder is delivered to the chamber in cartridges, where used powder is removed in cartridges, and where parts are separated in situ after having been cleaned of entraining powder, all without requiring opening of the system and exposure to its environment. This integrated powder handling is a desirable feature of the present system, especially where exposure to the part material in powder form is undesirable.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method for delivering powder to a target area at a surface in an apparatus in the production of parts by an additive process, comprising:
   lifting a first volume of powder above said surface at a first location on a first side of said target area;
   moving a member across said target area from beyond said first location so that a first layer of powder is delivered across said target area;
   performing said additive process to selected portions of said first layer of powder at said target area;
   lifting a second volume of powder above said surface at a second location on a second side of said target area;
   after said performing step, moving said member across said target area from beyond said second location so that a second layer of powder is delivered across said target area; and
   performing said additive process to selected portions of said second layer of powder at said target area.

2. The method of claim 1, wherein said member comprises a roller.

3. The method of claim 2, wherein said each of said moving steps comprise:
   translating said roller across said target area; and
   rotating said roller in a direction counter to the direction of said translating step.

4. The method of claim 1, wherein said step of lifting said second volume of powder is performed after said performing step.

5. The method of claim 1, wherein said lifting steps each comprise:
   upwardly moving a piston, having powder disposed thereover, so that said volume of powder is lifted through an opening in said surface.

6. The method of claim 5, wherein said apparatus includes first and second pistons located at said first and second locations, respectively;
   wherein said apparatus further includes a part cylinder located at said target area, said surface having an opening thereat, said part cylinder having fused and unfused powder disposed thereover;
   and further comprising:
   prior to said step of moving said member from beyond said first location, lowering said part cylinder; and
   after said step of performing said additive process in said first layer, and prior to said step of moving said member from beyond said second location, lowering said part cylinder.

7. The method of claim 5, further comprising:
   loading first and second powder cartridges into said apparatus below said first and second locations, respectively, said first and second powder cartridges each including movable bottom panels with powder disposed thereover, said movable bottom panels serving as said pistons.

8. The method of claim 7, wherein each of said performing steps comprise fusing selected portions of said layer of powder into a mass at said target area, said selected portions corresponding to a cross-section of a part;

wherein said step of performing said additive process in said second layer of powder fuses the selected portions of said second layer of powder to a portion of the mass fused in said first layer of powder.

9. The method of claim 8, wherein each of said fusing steps comprise directing an energy beam at selected portions of said layer.

10. In an apparatus for producing parts from powder, said apparatus including a target area at which an additive process is performed to produce a part, the powder delivery system comprising:

a plate, having first and second openings therethrough on first and second sides of said target area;

a first powder piston, located below said first opening, for pushing a volume of powder through said first opening above the surface of said plate;

a second powder piston, located below said second opening, for pushing a volume of powder through said second opening above the surface of said plate; and means for distributing powder from above said first powder piston to said target area, and from above said second powder piston to said target area.

11. The system of claim 1, wherein said distributing means comprises:

a roller; and a motor coupled to said roller, for moving said roller across said plate from beyond said first opening to beyond said second opening.

12. The system of claim 11, wherein said motor is coupled to said roller in such a manner that said roller rotates counter to the direction of travel across said plate.

13. The system of claim 12, wherein said motor is coupled to said roller in such a manner that the rotation of the roller is slaved to the travel of the roller across said plate.

14. The system of claim 10, wherein said first powder piston a first piston surface, over which powder may be disposed;

a first piston motor coupled to said first piston surface, for moving said first piston surface upwardly and downwardly relative to said plate.

15. The system of claim 10, wherein said first powder piston comprises:

a first powder cartridge, having a movable bottom, for holding powder therein;

a first piston plunger, for contacting said movable bottom of said first powder cartridge; and a first piston motor, coupled to said first piston plunger, for moving said first piston plunger upwardly and downwardly so that said movable bottom of said first powder cartridge moves upwardly and downwardly.

16. The system of claim 15, wherein said first piston cartridge comprises a container having rigid sidewalls and a movable bottom panel.

17. The system of claim 15, further comprising:

means for receiving said first piston cartridge, so that said first piston cartridge can be removed from and installed into said system.

18. The system of claim 17, wherein said second powder piston comprises:

a second powder cartridge, having a movable bottom, for holding powder therewithin;

a second piston plunger, for contacting said movable bottom of said second powder cartridge;

a second piston motor, coupled to said second piston plunger, for moving said second piston plunger upwardly and downwardly so that said movable bottom of said second powder cartridge moves upwardly and downwardly; and drawer slides for receiving said second piston cartridge, so that said second piston cartridge can be removed from and installed into said system.

19. The system of claim 15, further comprising:

a distributor disposed below said first opening, for distributing the powder in said first powder piston thereat.

20. The system of claim 10, wherein said target area is located over a part cylinder, said part cylinder comprising:

a part cylinder surface for holding fused and unfused powder, said part cylinder surface located under a part opening in said plate; and a part cylinder motor, for downwardly moving said part cylinder surface so that the part being produced is lowered from said target area to allow for delivery of powder thereover.

21. An apparatus for producing parts at a target area at which an additive process is performed, comprising:

a chamber, having a target area at which said additive process is performed, and having a first opening through its bottom on a first side of said target area;

means for fusing selected portions of a layer of powder at said target area;

a first powder piston assembly, located below said first opening, for pushing a volume of powder through said first opening into said chamber, comprising:

a removable powder cartridge having a movable bottom;

means for receiving said cartridge into said first powder piston assembly; and means for moving the bottom of said cartridge, said moving means engaged by said cartridge when received by said receiving means; and means for distributing powder from above said first powder piston to said target area.

22. The apparatus of claim 21, wherein said first piston cartridge comprises a container having rigid sidewalls and a movable bottom panel.

23. The apparatus of claim 21, wherein said first piston cartridge comprises:

a bag for retaining powder;

a housing for suspending said bag; and and wherein said moving means comprises means for moving the bottom of said bag upwardly and downwardly when suspended in said housing, so that said bag feeds and receives powder, respectively.

24. The apparatus of claim 21, wherein said chamber bottom has a second opening therethrough on a second side of said target area;

and further comprising:

a second powder piston assembly, located below said second opening, for pushing a volume of powder through said second opening into said chamber, comprising:

a removable powder cartridge having a movable bottom;

means for receiving said cartridge into said second powder piston assembly;

and wherein said distributing means also is for distributing powder from above said second opening to said target area.

25. The apparatus of claim 21, further comprising:

means, within said chamber, for removing said part and its entraining powder from said target area while maintaining the atmospheric integrity of said chamber.

26. The apparatus of claim 21, further comprising:

means for isolating said means for receiving said powder cartridge from said chamber, so that said removable cartridge may be installed therein while maintaining the atmospheric integrity of said chamber.

* * * * *